March 7, 1944. G. E. FORD ET AL 2,343,545
COMBINATION ELECTRIC SWITCH AND INDICATING MECHANISM
Filed May 8, 1940 2 Sheets-Sheet 1

INVENTORS
GEORGE E. FORD
WARREN W. HASTINGS
WILLIAM B. CONNOLLY
BY
ATTORNEY

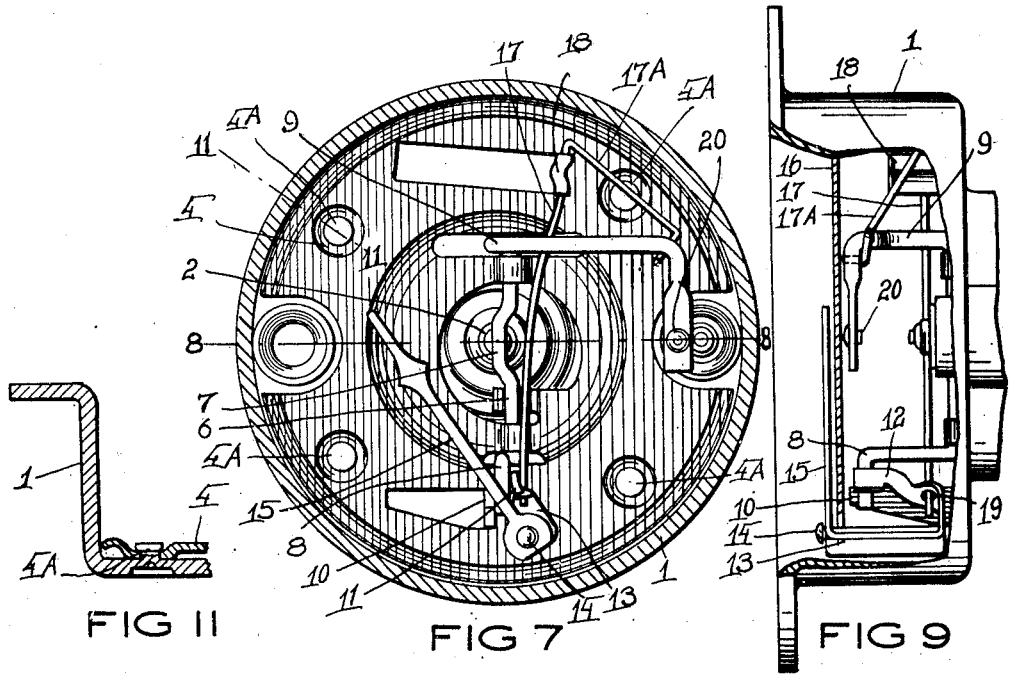
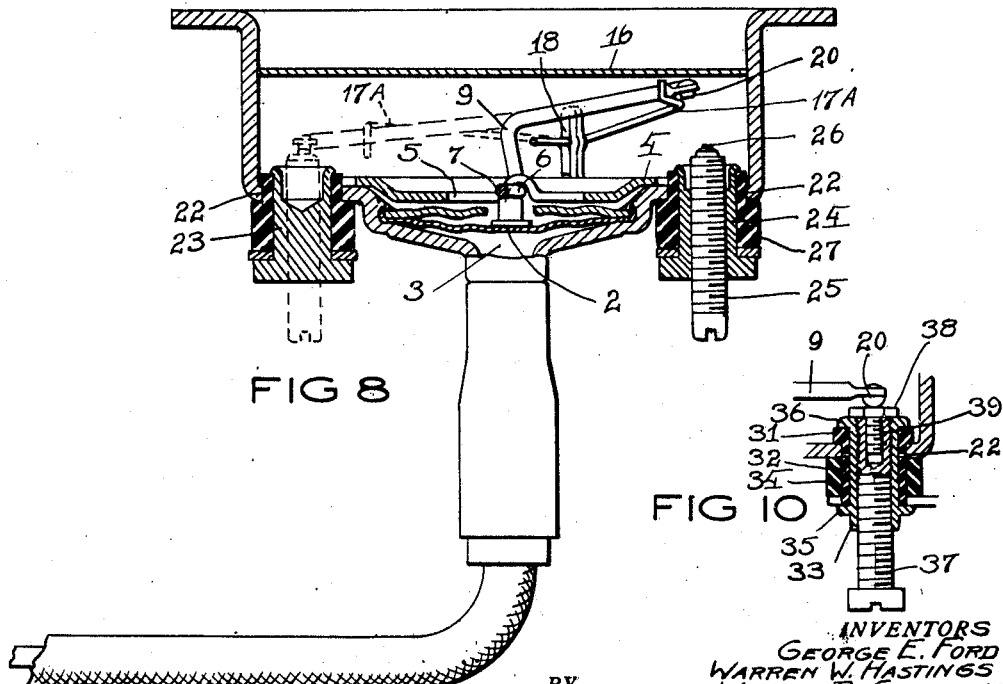

Patented Mar. 7, 1944

2,343,545

UNITED STATES PATENT OFFICE 2,343,545

COMBINATION ELECTRIC SWITCH AND INDICATING MECHANISM

George E. Ford, Warren W. Hastings, and William B. Connolly, Rochester, N. Y., assignors to Rochester Manufacturing Company, Rochester, N. Y., a corporation of New York Application May 8, 1940, Serial No. 334,000

5 Claims. (Cl. 200—56)

This invention relates to electric switches and has for one of its objects to provide a novel switch mechanism which may be used to effect the closing of an electric circuit at either one end or the other of the movement of the actuating member.

A further object of this invention is to provide the electric switch with novel insulated mountings for the terminals thereof.

Another object of this invention is to provide the electric switch with a novel arrangement of operating means with facilities to provide for the use of the switch in an electric signal circuit for indicating one or the other of two positions of the actuating member.

A still further object of this invention is to provide a novel combined indicator and electric switch mechanism.

Still another object of the invention is to provide an electric switch mechanism which may be adapted for use in a pressure gauge or heat indicating device for the operation of an electric signal at either high or low pressure or high or low heat.

A further object of this invention is to provide an electric switch which is adapted for use with internal combustion engines, Diesel engines and other machines and have it operate as a safety switch to shut off the engine or machine in case of overheating or lack of oil pressure.

All these and other objects of this invention will become more readily apparent from the detailed description thereof which follows, reference being had to the accompanying drawings in which Figure 1 is a top plan view of a temperature gauge embodying our invention.

Figure 7 is an enlarged horizontal section of the combined electric switch and gauge illustrated in Figure 2 and taken on the line 7—7 thereof.

Figure 8 is an enlarged vertical section of the combined switch and gauge taken on the line 8—8 of Figure 7.

Figure 9 is an enlarged side elevation thereof with the casing of the gauge partly broken away.

Figure 10 is an enlarged detail sectional view of a modified form of terminal and contact member of the combined switch and gauge.

Figure 11 is a detail sectional view taken on the line 11—11 of Figure 7.

Figure 1:
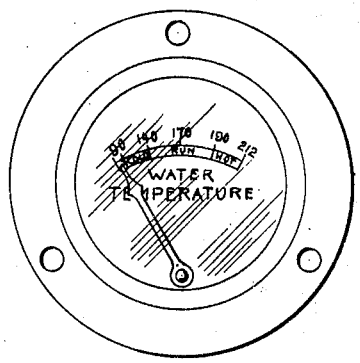

As illustrated in the several figures of the drawings the combined switch and gauge structure, forming the subject matter of our invention, comprises the cylindrical casing 1 which houses both the switch and the gauge mechanism together with the common actuating member in the form of a diaphragm 2. This diaphragm closes the inlet 3 at the back of the casing and its movement is effected by the pressure of the liquid or gas in the line which is connected thereto. In the bottom of the casing is provided the movement plate 4 which is formed to support the various members of the switch and gauge mechanism. The movement plate is firmly anchored to the bottom of the casing and for this purpose is provided with a series of holes thru which extend the lugs 4A which are struck up from the bottom of the casing and are headed over on top of the movement plate as illustrated in Figure 11. Centrally of the movement plate is provided a hole 5 thru which the movement of the diaphragm 2 is transmitted to the rocking shaft 6. The latter extends diametrically across the opening 5 and has the crank 7 formed therein for operative connection with the diaphragm 2. The rocking shaft is suitably journaled on the movement plate and at the ends of the shaft are provided the crank arms 8 and 9 which project upwardly therefrom.

Crank arm 8 is bent at the top to engage the stop 10 on one side and the cam surface 11 of the arm 12 on the other side. The latter forms part of the rocking member 13 which is mounted on the pivot pin 14. Formed integrally on the rocking member at one end thereof is the pointer 15 which is adapted to cooperate with the dial 16 to indicate the temperature or pressure which causes the movement of the diaphragm. A spring arm 17 supported on the lug 18 engages into a hole 19 provided in the rocking member 13 so as to yieldingly hold this member with its cam surface 11 in constant contact with the arm 8 for movement thereby.

Arm 9 of the rocking shaft 6 is bent at right angles to extend first to one side or the other of the shaft and then parallel thereto to a point substantially in line with the center of the diaphragm 2 where it carries the contact point 20.

The spring arm 17 exerts but a light pressure on the rocking member in order to yieldingly keep this member in contact with the arm 8 to have it follow its swinging movement in either direction without materially interfering with the operation of the diaphragm 2. The spring action of the spring arm 17, however, is not sufficient to efficiently operate the arm 9 in making and breaking or maintaining an electric circuit as will hereinafter be described. For this reason the spring forming the spring arm 17 is extended beyond its anchorage in the lug 18 and is bent to provide the spring arm 17A. The latter, in the form illustrated in Figures 7, 8 and 9, has its hook shaped end engage under the arm 9 substantially at the outer bend thereof so as to produce a yielding pressure against the arm sufficient to assist the spring arm 17 in the operation of the extension arm 9 without interfering with the operation of the diaphragm 2 in its movement of the crank 7 of the rocking shaft 8. This provides a positive contact breaking spring for the switch mechanism illustrated in full lines in Figures 7, 8 and 9 and a positive contact making spring for the switch mechanism illustrated in dotted lines in Figure 8.

In the bottom of the casing 1, uniformly spaced from the diaphragm 2 and diametrically arranged relative thereto, are duplicate holes 22, 22 in which electric terminal members 23 and 24 are held electrically insulated from the casing. The terminal member 23 merely closes its opening 22 and provides for the attachment of an electric connection thereto. The other terminal member 24 has a terminal post 25 threaded therethru with a contact point 26 at the top thereof in order to have the contact point 20 of the arm 9 engage therewith to complete an electric circuit therethru.

As above pointed out, each terminal member is electrically insulated from the casing and this insulation is provided by the bushing 27 which is inserted thru the hole in the casing. The bushing is made of either one-half hard rubber, fiber or other suitable insulating material. Passing thru the bushing 27 is the metal terminal member which, in the case of terminal 24, comprises a sleeve which is countersunk at its upper end to permit its expansion in the end of the bushing 27 to in turn expand the bushing 27 in the hole 22 of the casing and thus hold the bushing firmly anchored in place in the casing.

Threaded thru the metal sleeve is the terminal post 25 so that the contact point 26 thereof can be adjustably set for engagement by the contact point 20.

The terminal members 23 and 24 are electrically connected by a jumper 28 which extends from one terminal member to the other at the bottom of the casing around the inlet thereof.

Figure 6:
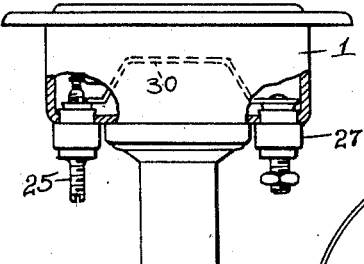
Figure 6 is a side elevation of a gauge embodying a modified form of our invention with parts of the casing of the gauge broken away.
Figure 2:
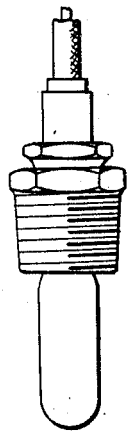
Figure 2 is a side elevation thereof partly broken away.
Figure 5:
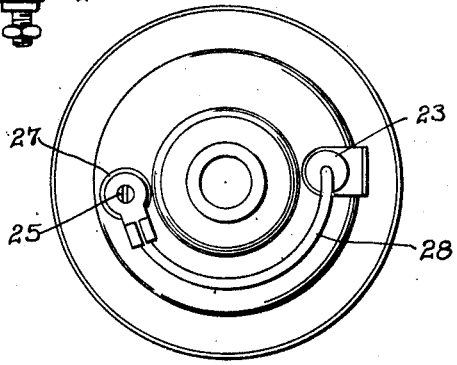
Figure 5 is a bottom plan view thereof.

In the modified form illustrated in Figure 6, the jumper 30 is adapted to connect the terminals on the inside of the casing by bridging the diaphragm operated mechanism of the switch and gauge.

In Figure 10 is illustrated a modified form of insulated mounting for the electric terminals. In this construction an insulating bushing 31 is centered in the hole 22 and a second bushing 32 is held in line with it by means of the metallic sleeve 33 which passes thru both bushings. A third bushing 34 surrounds the bushing 32 and by upsetting the metal of the sleeve 33 against the ends of the bushings 31 and 32 at 35 and 36 the two bushings are drawn together in the hole 22 and bushing 34 and thus rigidly anchored in place and electrically insulated on the casing. A post 37 is threaded thru the sleeve 33 for adjustment therein and a contact point 38 carried on the stud 39 is threaded into the end of the post for attachment thereto and contact by the contact point 20 of the arm 9.

Figures 1, 2, 7, 8 and 9 illustrate the switch for operation with the indicating mechanism when effected by a thermo-responsive member. In this construction the arm 9 is arranged on the rocking shaft to close the electric circuit at the end of its movement so that a warning signal may be operated when a predetermined high temperature has been reached.

Figure 3:
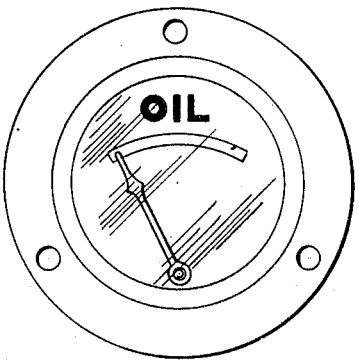
Figure 3 is a top plan view of a pressure gauge embodying the invention.
Figure 4:
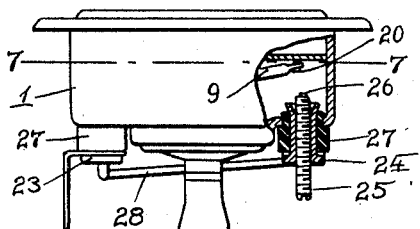
Figure 4 is a side elevation thereof partly broken away.
Figure 4:
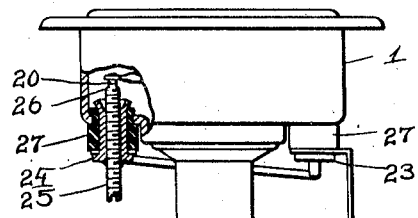

In Figures 3, 4, 6 and in dotted lines in Figure 8 the switch is illustrated in connection with the indicating mechanism when used as a pressure gauge. In this case the arm 9 is arranged on the rocking shaft to have the electric circuit closed by the arm at the beginning of its movement, that is the low pressure position of the gauge so that a warning signal may be operated whenever a predetermined low pressure allows the arm 9 to return to its starting position and close the electric circuit.

While the casing and part of the switch mechanism of the combined switch and gauge is illustrated in the drawings as being part of a "grounded" portion of an electric circuit, it will of course be readily apparent that the casing may be electrically insulated with the movable contact of the switch mechanism forming part of the electric circuit for the purpose of opening and closing said circuit. It is therefore within the scope of this invention to include the switch mechanism in a totally insulated circuit from the case if this is desired or advisable.

We claim:

1. In an electric switch the combination of a housing, a pressure operated diaphragm centrally of said housing, said housing having a pair of openings in the bottom uniformly spaced from said diaphragm and diametrically arranged relative thereto, interchangeable active and inactive terminal members held electrically insulated in said openings, a contact member carried by the active terminal member, contact means operated by said diaphragm movable into and out of contact with said contact member, and a jumper connecting said active and inactive terminal members.

2. In a combined indicating gauge and electric switch the combination of a housing, an actuating member movable in the bottom of said housing, a rocking shaft mounted substantially diagonally at the bottom of said housing, crank means intermediate the ends of said rocking shaft for contact with said actuating member, a crank arm at each end of said rocking shaft, a swinging pointer movable in said housing, a fixed contact member electrically insulated in said housing, means for operatively connecting the crank arm at one end of said rocking shaft with said pointer, and contact means carried by the crank arm at the other end of said rocking shaft for movement into and out of contact with said fixed contact member so as to simultaneously cause the operation of said pointer and the movement of said contact means on the movement of said rocking shaft by said actuating member.

3. In a combined indicator and electric switch the combination of a housing having an opening centrally of the bottom and an opening on each side of said central opening uniformly spaced therefrom and diametrically arranged thereto, a diaphragm closing the central opening, interchangeable terminal members closing said other openings electrically insulated from said housing, a contact member adjustable in one of said terminal members, a rocking shaft extending diametrically across said diaphragm and operatively connected therewith, an arm at each end of said rocking shaft, a pointer, and contact means carried by one of said arms for movement into and out of contact with said contact member, said other arm being operatively connected with said pointer for movement thereby.

4. In a combined electric switch and indicating mechanism the combination of a housing, actuating means in the bottom of said housing, a rocking shaft movable in said housing, spring operated means for maintaining an operative connection between said indicating member and said actuating means thru said rocking shaft, a switch arm on said rocking shaft, a normally fixed contact member in said housing, supplemental spring means operating said switch arm for positively maintaining an operative connection between said switch arm and said contact member at one end of the movement of said switch arm by said rocking shaft.

5. In a combined electric switch and indicating mechanism the combination of a housing, a fixed insulated contact in said housing, an actuating member in said housing, a rocking shaft movable in said housing, a crank on one end of said rocking shaft, a rocking member, an indicator operated by said rocking member, a spring finger for yieldingly holding said rocking member in engagement with said crank for movement of said indicator by said actuating member, a second crank at the other end of said rocking shaft, a contact carried by said second crank for movement into and out of contact with said fixed contact in said housing, and a second spring finger engaging said second crank for effecting positive contact between the contact of said second crank and the fixed contact in said housing.

GEORGE E. FORD.
WARREN W. HASTINGS.
WILLIAM B. CONNOLLY.